No. 797,566. PATENTED AUG. 22, 1905.
W. E. ELLIS.
HOLDER FOR SHOE UPPERS.
APPLICATION FILED FEB. 16, 1903.

Witnesses:
Arthur F. Randall
Joseph T. Brennan

Inventor:
W. E. Ellis,
By E. D. Chadwick,
Attorney.

UNITED STATES PATENT OFFICE.

WARREN EUGENE ELLIS, OF HAVERHILL, MASSACHUSETTS, ASSIGNOR TO ELLIS LACER COMPANY, A CORPORATION OF MAINE.

HOLDER FOR SHOE-UPPERS.

No. 797,566.          Specification of Letters Patent.          Patented Aug. 22, 1905.

Application filed February 16, 1903. Serial No. 143,698.

*To all whom it may concern:*

Be it known that I, WARREN EUGENE ELLIS, a citizen of the United States, and a resident of Haverhill, in the county of Essex and State of Massachusetts, have invented new and useful Improvements in Holders for Shoe-Uppers, of which the following is a specification.

In the manufacture of shoes it is the common practice to tie the uppers as fast as they are stitched in bunches or bundles, each of which contains as many uppers of a given size as are intended for one case of shoes. Enough of these bundles are collected to make up one case of shoes and they are then passed on to the lasters.

My invention is intended to provide a simple and practical device by means of which all the uppers required for making up one case of shoes may be conveniently bunched and assembled, and may then be transported to the lasters and used as desired without danger of mixing the sizes and without involving the continual consumption of twine which has hitherto been necessary.

A holder for shoe-uppers embodying my invention in its preferred form is illustrated in the accompanying drawings, in which—

Figure 1:
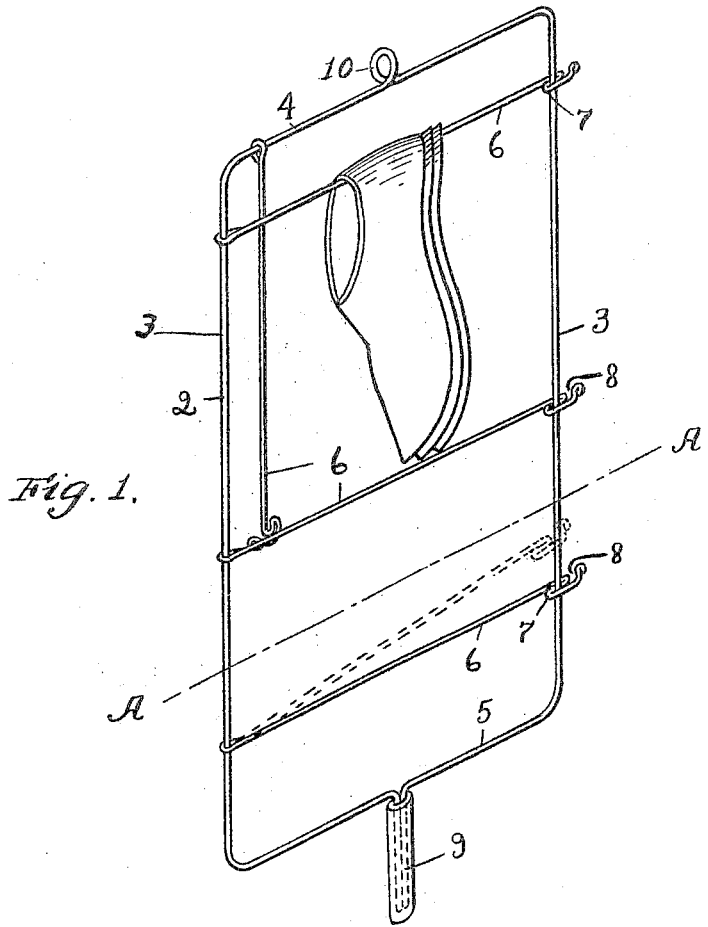
Figure 2:
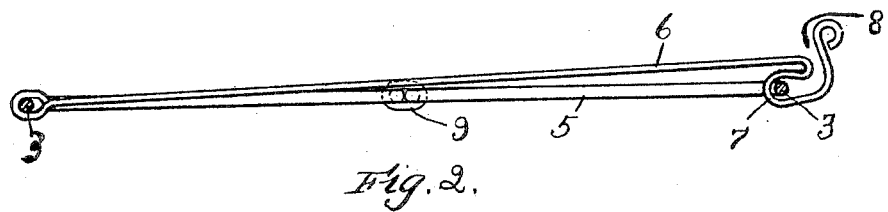

Figure 1 is a perspective view of the holder with a portion of a bunch of uppers secured thereto. Fig. 2 is a section on the line A A in Fig. 1 looking downward.

My holder, as shown in the drawings, comprises a preferably rectangular frame 2, which may be made of heavy wire and has side portions 3 and top and bottom portions 4 and 5. This frame is provided with a number of arms 6, four of these arms being illustrated, although nine or ten of them are commonly employed, according to the number of the different sizes of uppers required for one case of shoes. Each arm 6 is so formed and combined with the frame 2 that it may be made to form, in connection with said frame, a closed loop of which the arm forms one side, or it may be separated from the frame sufficiently to open the loop. This is preferably accomplished by hinging one end of each arm to one of the side portions 3 and providing its free end with means for detachably engaging the opposite side 3. Each of these arms is intended to receive a bunch of uppers, all of the same size, through which uppers the arm is passed while its free end is disconnected from the frame, and said free end is then connected with the frame to form the closed loop above referred to. In this manner the uppers of each bunch or size are kept together and are also kept separated from all the other bunches of uppers.

For detachably connecting the free ends of the arms 6 with the frame 2 I prefer to employ the construction best shown in Fig. 2, according to which each arm is made somewhat longer than the distance between the side portions 3 of the frame 2 and is bent near said free end into substantially the form shown, thus providing a jaw 7 located at a distance from the hinged end of the arm 6 somewhat less than the distance between the side portions 3 and having a lateral notch or opening 8 at its outer end, which lateral opening 8 is of sufficient size to receive the side portion 3 by springing the free end of the arm slightly outward. Each arm 6 is hinged to the opposite side portion 3 somewhat loosely, and as thus constructed the free end of any one of the arms 6 may be disengaged from or engaged with the corresponding side portion 3 independently of any other arm 6 by tilting it into the position shown in dotted lines in Fig. 1 and then removing said portion 3 from the jaw 7 by passing it through the notch 8, or conversely. It will be understood that in practice all the arms and bunches of uppers slide downward until they rest and are supported one upon another, being shown as separated in the drawings for the sake of clearness.

My holder is preferably provided with a rigid projection or handle 9, secured to its bottom portion 5, which handle may be set in a hole in a bench or other support for the purpose of holding the frame in an upright position, and said frame may also be provided at its top with an eye 10, whereby it may be suspended from a hook, if desired.

In use the operator takes an empty holder and slides the hinged ends of all the arms 6 onto the top portion 4 of the frame 2, as indicated in Fig. 1, in which position they are suspended freely out of the way of the operator. The operator then brings one of the arms 6 into convenient position and strings a bunch of uppers of a given size upon it as fast as the stitching of that size is completed, and the free end of this arm 6, with these uppers strung upon it, is then secured to the frame 2. Another arm 6 is then slid down into position to receive another bundle of uppers, and this process is repeated until enough uppers to make up one case of shoes have been secured to the holder. The holder may then be hung up by its eye 10 until its uppers are required by a laster, and it is then handed over to the laster, who disengages the arms 6 and removes the bunches of uppers therefrom as fast as they are required for lasting. The arms 6 may be evidently hinged to either of the side portions 3 of the frame 2, or part may be hinged to one side and part to the other. It will also be noted that any arm 6 may be engaged with or disengaged from the frame independently of the other arms, so that uppers of any given size may be applied to the holder or withdrawn therefrom independently of the other sizes as required.

While I have herein illustrated and described my invention as applied to a holder for shoe-uppers, it will be obvious that it may be used for detachably holding other articles, and I do not intend it to be limited to the use herein described nor to the precise construction and arrangement of parts illustrated, since the same may be varied without departing from my invention, particularly with respect to the means for detachably connecting the free ends of the arms with the frame.

I claim as my invention—

1. A device of the character described, comprising a frame 2 provided with one or more arms 6 hinged thereto and also mounted to slide thereon lengthwise of the frame, the free end of each arm being formed to detachably engage said frame.

2. A device of the character described, comprising a frame provided with one or more arms independently hinged thereto and also mounted to slide thereon, lengthwise of the frame, each of said arms being constructed at its free end to detachably engage one side of said frame and to form a closed loop when engaged therewith.

3. A device of the character described, comprising a frame 2 and one or more arms 6, each of said arms being loosely hinged at one end to one side of said frame and provided near its other end with a jaw 7 and a notch 8, said notch being located in position to receive the other side of the frame when the arm is inclined with respect thereto.

4. A device of the character described, comprising a frame 2 provided with a handle 9 and an eye 10, and with one or more arms 6, each hinged at one end to one side of said frame and provided near its free end with means for detachably engaging the other side of said frame.

5. A device of the character described, comprising a rectangular frame 2 provided with a handle 9 and an eye 10, and with one or more arms 6, each of said arms being loosely hinged to one side of said frame and provided near its free end with a jaw 7 and a notch 8.

In testimony whereof I have hereunto subscribed my name this 7th day of February, 1903.

WARREN EUGENE ELLIS.

Witnesses:
E. D. CHADWICK,
JOSEPH T. BRENNAN.